United States Patent
Pigelet et al.

(10) Patent No.: US 6,876,195 B2
(45) Date of Patent: Apr. 5, 2005

(54) METHOD AND DEVICE FOR MEASURING THE THICKNESS OF AN OXIDE LAYER ON THE PENCIL CLADDING IN A FUEL ASSEMBLY

(75) Inventors: Jérôme Pigelet, Lyons (FR); Michel Pain, Chorey (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/451,479

(22) PCT Filed: Dec. 19, 2001

(86) PCT No.: PCT/FR01/04083
§ 371 (c)(1),
(2), (4) Date: Oct. 23, 2003

(87) PCT Pub. No.: WO02/052222
PCT Pub. Date: Jul. 4, 2002

(65) Prior Publication Data
US 2004/0051523 A1 Mar. 18, 2004

(30) Foreign Application Priority Data
Dec. 22, 2000 (FR) ............................................ 00 16974

(51) Int. Cl.[7] .............................. G01B 7/10; G01B 7/14
(52) U.S. Cl. ......................................... 324/230; 324/202
(58) Field of Search ............................ 324/202, 207.11, 324/207.15, 207.16, 207.26, 219–221, 226–227, 229–231, 262; 376/245, 249, 258

(56) References Cited

U.S. PATENT DOCUMENTS 3,024,181 A * 3/1962 Howard et al. .............. 376/421
H001262 H * 12/1993 Bacvinskas et al. ......... 376/252

FOREIGN PATENT DOCUMENTS

FR 2 656 415 6/1991

* cited by examiner

Primary Examiner—N. Le
Assistant Examiner—Reena Aurora
(74) Attorney, Agent, or Firm—Kenyon & Kenyon

(57) ABSTRACT

A process for measuring the thickness of a layer of oxide on a rod cladding in a fuel assembly comprising a bundle of rods parallel to each other and held in a framework comprising spacer grids for transversely holding rods distributed in an axial direction of the bundle.

7 Claims, 6 Drawing Sheets

METHOD AND DEVICE FOR MEASURING THE THICKNESS OF AN OXIDE LAYER ON THE PENCIL CLADDING IN A FUEL ASSEMBLY

The invention relates to a process and device for measuring the thickness of a layer of oxide on the rod cladding in a fuel assembly.

Fuel assemblies used in water-cooled nuclear reactors and in particular in nuclear reactors cooled by pressurised water are known that comprise a cylindrical bundle of rods in parallel arrangements, held by a fuel assembly framework comprising spacer grids which hold the rods transversely and are distributed in a longitudinal axial direction of the bundle. The spacer grids are connected to each other by guide tubes. The spacer grids, guide tubes and end caps constitute the components of the fuel assembly framework in which the fuel rods are introduced during manufacture or reconstruction of the fuel assembly.

Each rod in the fuel assembly consists of an elongate tube made of zirconium alloy, containing a stack of fuel pellets and closed at its ends by stoppers.

The spacer grids comprise a uniform network of fuel rod receiving cells, such that the rods are arranged in the fuel assembly bundle in parallel rows with passing spaces arranged between them and each disposed between two rows of rods.

Fuel assemblies are the subject of research and development to increase fuel life in the nuclear reactor. In particular, the life of fuel assemblies depends on the corrosion resistance of the rod cladding made of zirconium alloy, inside the nuclear reactor.

In some cases, the rod cladding may be subject to corrosion which is manifested by the appearance of cracks and the release of fuel fission products in the cooling water of the nuclear reactor. It is then necessary to replace leaking fuel assemblies as soon as possible, which can only be done during shutdown of the nuclear reactor, during which the assemblies to be replaced are transferred into a deactivation bath in a fuel building adjoining the nuclear reactor building.

In order to follow the progress of corrosion of the rod claddings and improve resistance to corrosion, it is desirable to have processes and devices for measuring the thickness of the oxide layer that forms on the outer surface of the rod cladding and represents the corrosion resistance of the rod t, after a particular period of use in the nuclear reactor.

This measurement of the thickness of the oxide layer on the rod cladding can be conducted on the rods held inside the fuel assembly, by using a process and device such as described for example in the French patent FR-2,656,415.

To implement the measurement process, the fuel assembly is suspended under water inside a bath, generally inside a reactor deactivation bath and, for the measurements, a device is used which is carried by a manipulator such as a cross-movement table; the cross-movement table may itself be fixed on the upper portion of an assembly transport receiver of a deactivation bath chute.

The measuring device can thus be moved along the whole length of the fuel assembly and produce movement of a measuring device inside the fuel assembly between any two successive spacer grids, from a lateral face of the fuel assembly having generally the form of a right square-section prism.

The measuring device comprises a flexible metal blade, known as a sabre, at the end of which is fixed an eddy current probe comprising a measuring coil and a reference coil. The probe is moved using the sabre, in each of the passing spaces between two rows of fuel assembly rods, in such a way that an active portion or measuring head of the eddy current probe comprising a contact portion made of a wear-resistant material such as zirconia comes into contact successively with each rod in a row of rods lining the passing space of the sabre and probe. The reference coil remains constantly in contact with a metallic portion of the measuring device having the electrical characteristics of a fuel rod cladding.

The differential voltage is measured between the measuring coil and the reference coil constituting the signal of the eddy current probe supplied with alternating current.

Eddy current equipment connected by a cable to the probe fixed to the end of the sabre allows the components of the voltage signal in the impedance plane X, Y to be determined and displayed.

The components of the measured differential voltage represent complex impedance components of the probe supplied with alternating current, this impedance being dependent on the probe measuring coil connection, via the rods with which the measuring coil comes into contact while the sabre is moving. The air gap between the probe and the rod cladding forming the substrate on which the oxide layer is deposited and therefore the probe impedance depend in particular on the oxide layer covering the rod cladding.

Measurement of components X and Y of the probe differential voltage which represent the probe impedance components, allows the thickness of the oxide layer to be determined from a calibration curve which can be obtained by passing the probe over tubes that are free from oxide and are each covered by a plastic ring of well-defined thickness allowing the presence of an oxide layer to be simulated.

However, the calibration curve has to be updated for each measurement within a passing space between two rows of tubes. Accordingly, the measuring device comprises a standard measurement carrier on which, along two rows to come in the continuation of the rows of rods delimiting between them a passing space for the probe in the fuel assembly, are arranged standard tubes of which at least one is free from oxide allowing a reference measurement to be taken and of which the others are covered by oxide layers of variable thickness, for example from a few micrometers to a little over 100 $\mu$m.

In the case of the process and device according to the patent FR-2,656,415, the measurements taken by the probe are collected and recordings are made of the variations in at least one of the impedance components, in the impedance plane, in the form of a voltage, during travel of the probe, in a space between two rows of tubes.

The impedance values which are characteristic of the thickness of the oxide layer on each successive tube in the row of tubes are compared to the impedance curve troughs. From the calibration curve, the oxide thicknesses are determined and, by measuring the movement of the probe between two curve troughs, the distance between two successive rods is measured.

This process has a drawback in that the curve troughs depend on the exact position of the probe in relation to the lateral surface of the rod claddings, it not being possible to guarantee this position very precisely because it depends on the deformation of a plating spring in the measuring head of the probe against the tubes which varies as the probe travels in contact with the tubes, in an outward and return direction.

Moreover, the rod claddings of the fuel assemblies can be made from alloys of zirconium of different compositions having substantially different electrical resistivity. For example, the fuel rod claddings may be made of an alloy containing chromium, tin and iron, such as a Zircaloy 2 or 4 or an M5 alloy containing zirconium and niobium. The resistivities of these substantially different alloys cause very significant shifts in the measured impedances, such that it is no longer possible to use a standard calibration curve to determine oxide thicknesses.

The object of the invention is therefore to propose a process for measuring the thickness of a layer of oxide on a rod cladding in a fuel assembly comprising a bundle of rods parallel to each other and held in a framework comprising spacer grids for transversely holding rods distributed in an axial direction of the bundle, such that the rods are disposed in parallel rows with passing spaces provided between them and each disposed between two rows of rods, the measurement being taken under water and remotely, in a bath, by moving an eddy current probe in at least one space between two rows of rods, such that an active portion or measuring head of the probe comes into contact with a generatrix of each rod, in one or other of the rows situated on either side of the passing space and by collecting and processing a probe signal corresponding to at least one of the components of a voltage signal of the probe supplied with alternating current, in an impedance plane, to obtain values of the thickness of oxide on the rods with which the probe comes into contact, based on a calibration curve that is updated each time the probe passes in a space between two rows of rods, this process making it possible to take measurements and exploit them completely automatically, with increased precision and reproducibility.

Accordingly:

- the probe is moved along the whole length of the space between two rows of rods and in the extension thereof, such that the active portion of the probe comes into contact with at least one of the two rows of rods disposed on either side of the passing space and standard tubes, in an outward direction and in a return direction opposite to the outward direction,
- the probe signal is collected and transmitted in digital form to an arithmetic unit comprising software for processing the signal and determining the thickness of the oxide layer,
- the probe signal troughs are determined as it travels in the passing space between the rows of rods,
- the calibration curve is adjusted based on the trough values of the signal corresponding to the probe contact between the probe and the standard rods of known oxide thickness, these trough values on contact with the standard tubes being checked for consistency as the probe travels in the outward and in the return direction,
- the values of the thickness of the oxide layer corresponding to the signal troughs as the probe travels in the passing space between the rows of rods are determined, from the calibration curve,
- the consistency of the thickness values obtained for each rod within a row of rods is checked, and
- the consistent values of the thickness of the oxide layer for each rod are recorded and displayed.

The invention also relates to a measurement process that can be applied to any type of rod, whatever the nature of the metallic material forming the rod cladding.

In order to fully understand the invention, an embodiment of the invention will be described as an example, with reference to the accompanying figures, in the case of a fuel assembly for a pressurised water nuclear reactor.

Figure 1:
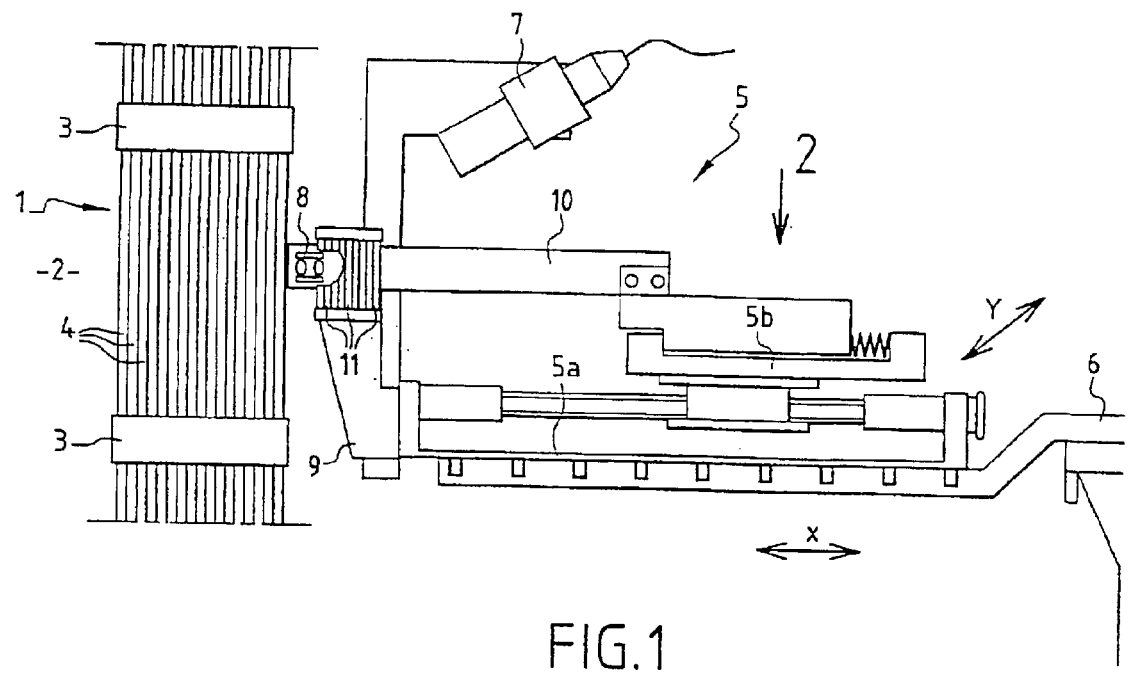
FIG. 1 is a lateral elevation of a measuring device to implement the process according to the invention.

FIG. 1 shows a fuel assembly designated generally by reference numeral 1, which is suspended inside the deactivation bath 2 of a nuclear reactor, by means of its upper cap (not illustrated) fixed to the sling of a lifting means. Thus, the fuel assembly 1 is suspended in a perfectly vertical position.

Figure 2:
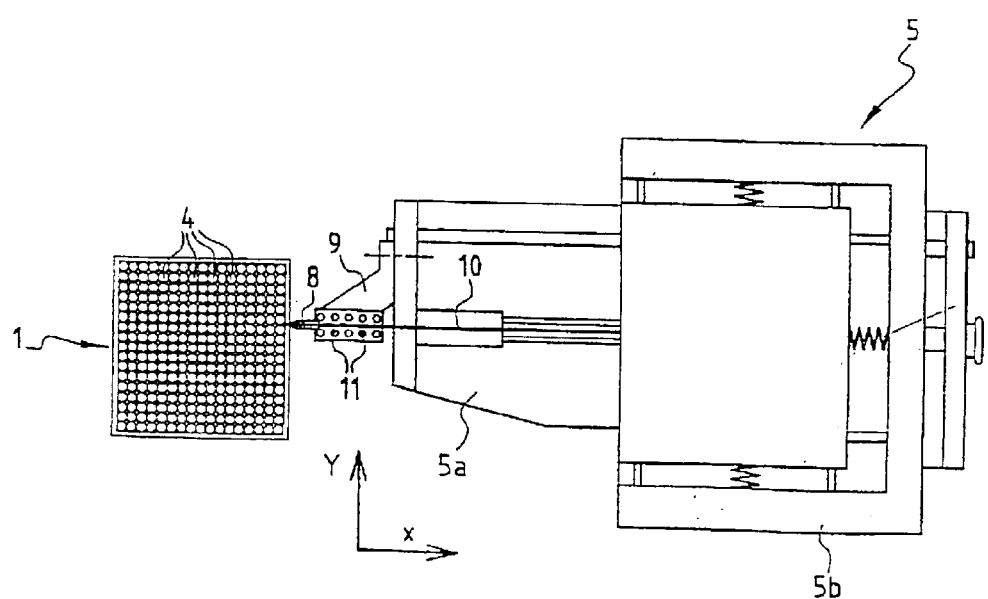
FIG. 2 is a plan view along 2 of FIG. 1.

The fuel assembly comprises a framework consisting in particular of spacer grids 3 distributed along the length of the fuel assembly 1 in which are engaged the rods 4 of the fuel assembly so as to constitute a bundle in which the rods are all parallel to each other and disposed according to a uniform network of square meshes in a square-shaped section of the fuel assembly, as can be seen in FIG. 2.

FIGS. 1 and 2 illustrate a device for moving an eddy current measurement probe, designated generally by the reference numeral 5, which comprises in particular a cross-movement table comprising a first element 5a or carriage, movable in a first horizontal direction y, parallel to a face of the fuel assembly 1 through which is introduced the sabre 10 and the eddy current probe 8 to take measurements and a second element 5b mounted movable in a second horizontal direction x perpendicular to the direction y on the first element 5a, the direction x being perpendicular to the face of the fuel assembly 1 through which is introduced the sabre 10 and the eddy current probe 8.

The sabre 10, consisting of a rectilinear metallic blade, of which the thickness is lower than the width of a passing space 12 between two rows of rods of the fuel assembly 1, is fixed in the direction x, on the second element 5b of the cross-movement table, so that the sabre 10 and the eddy current probe 8 can be moved along the whole length of any space 12 between two rows of rods, after the sabre has been placed in alignment with the space between two rows of rods between which measurements are taken, by moving the first element 5a of the cross-movement table.

The first element 5a of the cross-movement table also carries, by means of a support, a camera 7 to transmit to a command and control station situated above the level of the bath, an image of the face of the fuel assembly through which the probe and the sabre are introduced, in a zone comprising the ends of the rows of tubes between which the probe is introduced.

The first element 5a of the cross-movement table 5 also comprises a calibration support 9 on which standard tubes 11 can be fixed, in dispositions parallel to the fuel rods 4 and in the alignment of two successive rows of fuel rods, the sabre 10 being placed so that it can be introduced between the rows of standard tubes 11, before penetrating into the space between the two rows of rods of the fuel assembly.

By moving and adjusting the position of the carriage 5a of the cross-movement table, in the direction y, the calibration support 9 can be placed opposite the two rows of tubes 4 of the fuel assembly between which the sabre 10 and the eddy current probe 8 are moved to take measurements of the thickness of the oxide layer on the rods of at least one of the two rows.

By moving the second element 5b of the cross-movement table along x, in either direction, the sabre 10 and the eddy current probe can be moved between the standard tubes 11, then between the rods 4 of the two rows of rods.

Different safety devices are associated with the second element 5b of the cross-movement table 5 carrying the sabre 10 and, by means thereof, the probe 8, to avoid damaging the fuel assembly, during travel and introduction of the sabre and probe between the rows of rods. Such devices may consist of load limiters or proximity detectors.

Moreover, the carriage 5a of the cross-movement table is controlled in such a way that it can only be moved in its travel direction y when the sabre 10 is completely outside the fuel assembly.

Figure 4:
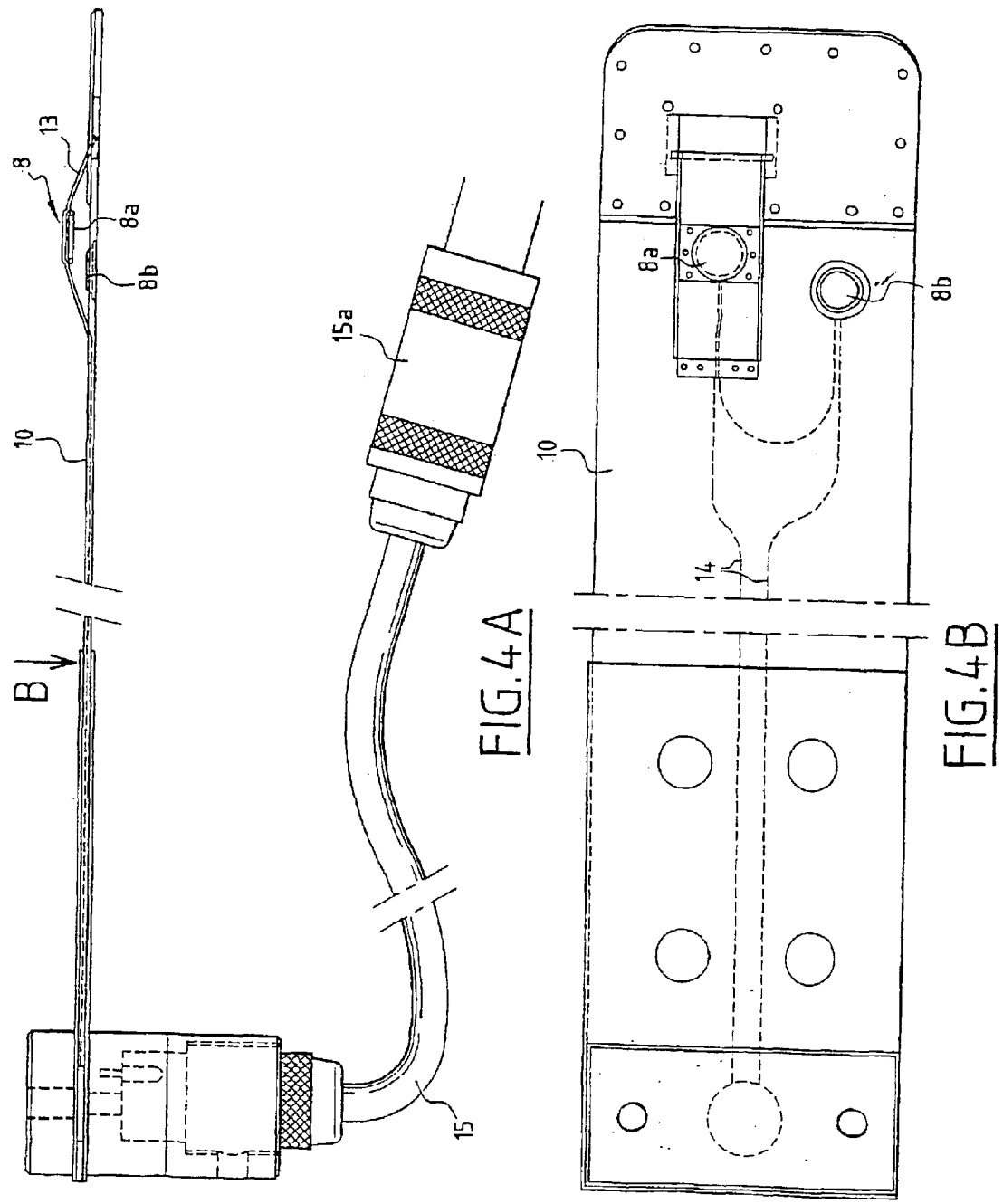
FIG. 4A is a lateral view of the sabre and of the measurement probe of the device according to the invention.
FIG. 4B is a plan view along B of FIG. 4A.

In FIG. 4A and FIG. 4B is illustrated the blade of the sabre 10 which carries, at one of its ends, by means of a blade-shaped plating spring 13, the measuring head 8a of the eddy current probe comprising the measuring coil, the reference coil 8b of the probe being placed on the end portion of the sabre 10, adjacent to the spring blade 13 and the measuring head 8a of which the portion in contact with the tubes is made of a material with good wear resistance such as zirconia.

The measuring coil 8a and the reference coil 8b are connected by measurement wires 14 to a measurement cable 15 connected to the end portion of the sabre 10 by means of which the sabre is fixed on the second element 5b of the cross-movement table.

Figure 5:
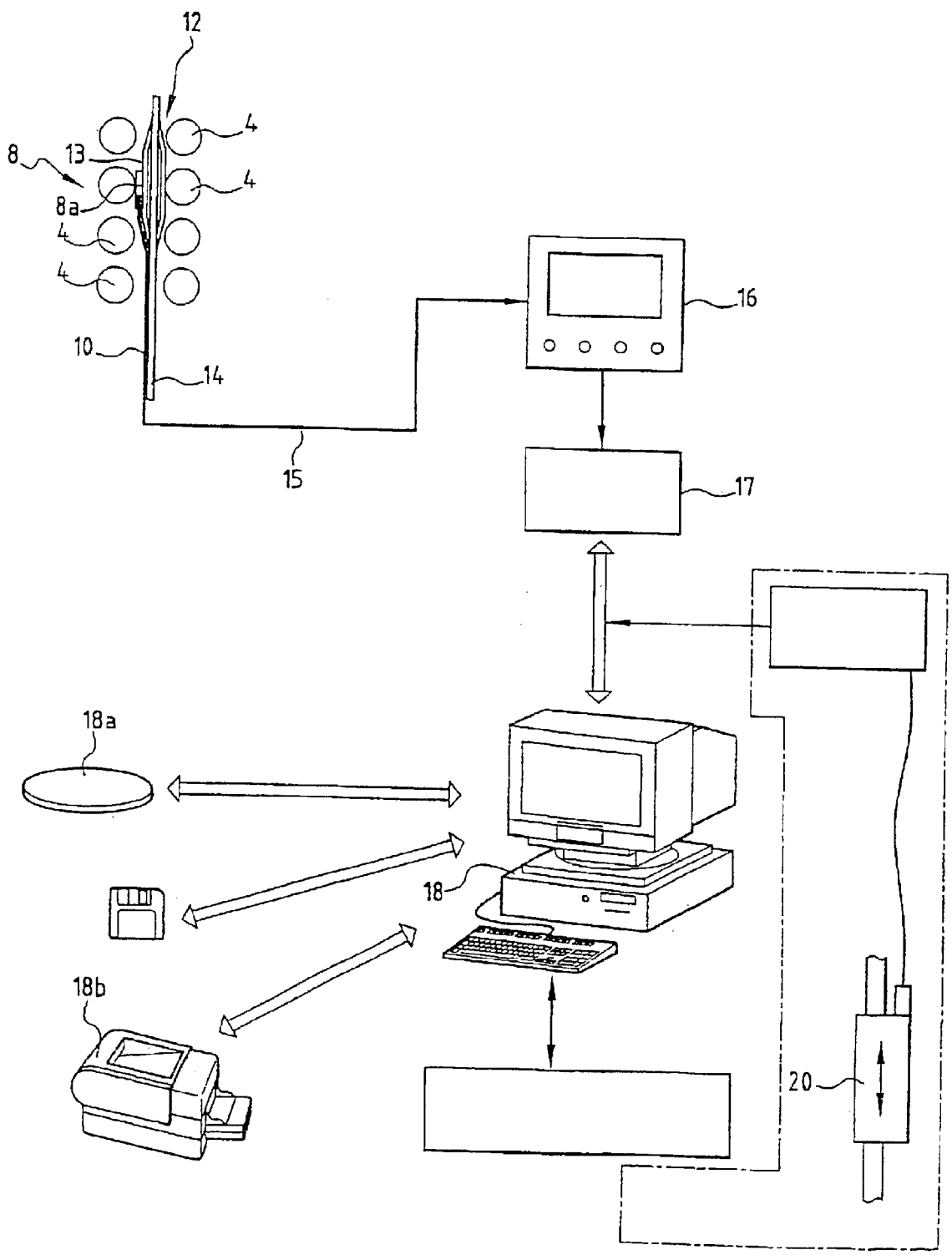
FIG. 5 is a diagrammatic view of the processing chain of the measurements taken by the probe of the device according to the invention.

The measurement cable 15 may be connected, by means of a connector 15a, to eddy current equipment 16, as can be seen in FIG. 5 which illustrates the measurement installation diagrammatically.

The measurement cable 15 allows a differential voltage representing the impedance of the measuring coil 8a of the eddy current probe 8 to be transmitted to the eddy current equipment 16 when the eddy current probe 8 is supplied with alternating current.

The eddy current equipment 16 allows the components of the impedance signal to be determined, from the voltage signal, in an impedance plane X, Y.

One of the components, generally component X, is chosen, which is transmitted to an analogue/digital converter 17 then, in the form of a digital signal, to a computer 18 in which is loaded software for processing the voltage measurements and determining the thickness of the oxide layer on the surface of the rods of the fuel assembly.

The analogue signal received from the probe by the eddy current equipment 16 is displayed on a screen of the equipment 16, in the form of a representation of it in the impedance plane X, Y.

While the eddy current probe 8 is moving in a space between two rows of tubes 4, the signal taken continuously from the probe is transmitted in digital form to the computer 18 which allows a very large number of measurement points to be obtained in the longitudinal direction of the space between two rows of rods.

The calculation program of the computer 18 allows in particular selection of a number of measurement points along the row of tubes.

The digitised representation of the probe during the scan in the longitudinal direction of the row of tubes can be displayed on the screen of the computer 18.

Figure 6:
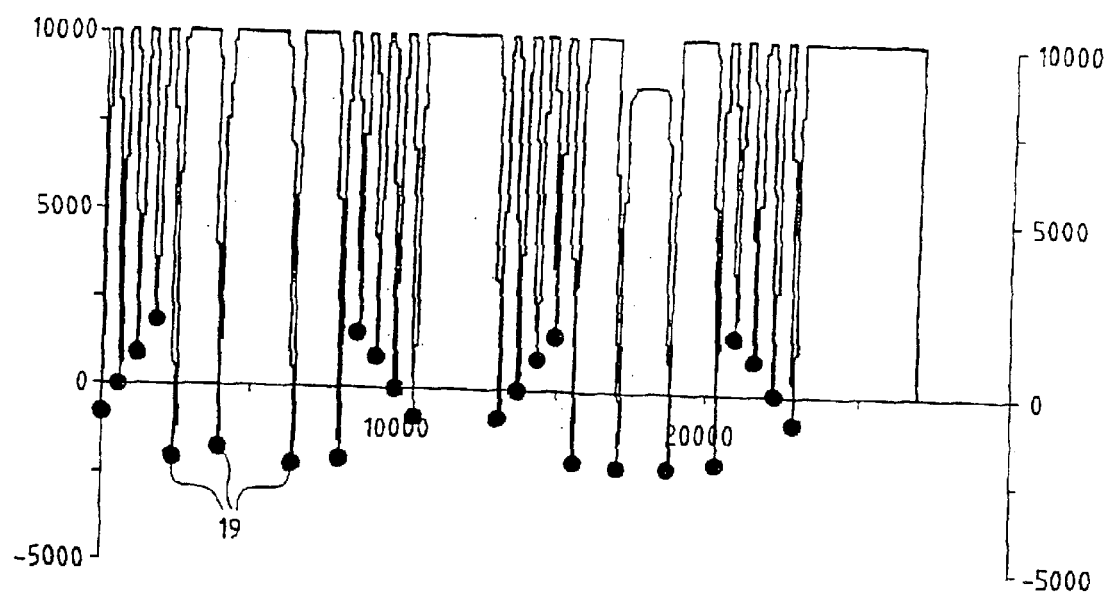
FIG. 6 is a curve representing the signal measured during travel of the probe in a space between rows of rods.

In FIG. 6 can be seen the image of the probe signal in digitised form, during a scanning operation of a row of tubes, with a very large number of measurement points during travel of the probe.

The computer program used by the computer 18 allows the troughs 19 of the digitised signal corresponding to the minimum impedances of the eddy current probe to be determined while the probe is in contact with the generatrix of a tube situated along a vertical plane delimiting the passing space between the rows of tubes.

The digital data concerning the troughs measured over the curve are stored on the hard disk 18a of a computer and, as well as being displayed on the computer screen, can be printed by a printer 18b.

During travel of the probe, the position of the probe in the row of tubes is measured, using a position detector 20, so as to synchronise data entry into the computer with the data relating to the position of the probe.

When the probe comes into contact with a tube along its contact generatrix, the signal is minimal, as illustrated in FIG. 6, but when the probe is between two successive tubes, the probe impedance signal is maximal and may be very high, such that the maximum values of the signal are levelled at a given value, the value of the signals used between the tubes of a row of tubes not being used to process the measurements.

The eddy current probe is moved in the space between two rows of tubes, in a first or outward direction, by moving away from the sabre movement device, then in a second or return direction, by returning toward the cross-movement table sabre movement device.

Measurement points corresponding to the troughs of the digitised signal curve are obtained, on both the outward and the return travel of the probe for each tube that can be identified by its position, using the measurements of the position detector 20.

Prior to scanning the row of tubes, on at least one side of the circulation space of the sabre and probe, the predetermined calibration curve is checked giving, depending on the probe signal in millivolts, the thickness of the oxide layer on a tubular envelope of a rod or of a standard gauge measure.

Figure 7:
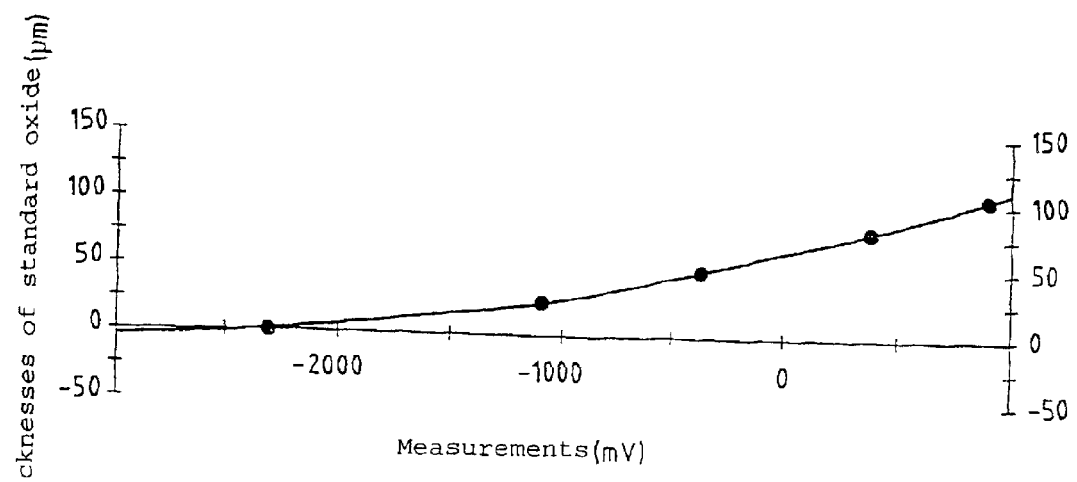
FIG. 7 shows a calibration curve for the probe for measuring the thickness of an oxide layer on the fuel rods.

A curve of this type is illustrated in FIG. 7, the equation of the curve being polynomial and having a degree of 2.

The equation of the calibration curve that has previously been determined is updated by an outward and a return pass of the probe 8 between the standard tubes 11 carried by the calibration support 9.

The values of the probe signal in millivolts are determined by analysis of the curve representing the digitised signal obtained during travel of the probe in the outward and return directions between the standard tubes 11.

The consistency of the voltage measurements taken on the outward and return journeys between the standard tubes 11 is checked, and the deviation between the outward and return signals for each of the standard tubes 11 must be lower than a determined limit. Generally, this limit is in the measurement precision margin.

The calibration values used correspond to the consistent values measured on contact with the standard tubes.

For example, in an embodiment of the invention process, five standard tubes are used having known respective oxide thicknesses of 1 $\mu$m, 25 $\mu$m, 49 $\mu$m, 80 $\mu$m and 105 $\mu$m.

The values of the signal in millivolts are measured on the outward and return travel of the probe, it being possible for these values to be positive or negative, and consistent measurement values taken on the standard gauge measures are reported on the calibration curve as illustrated in FIG. 7.

Inconsistent measurement values are detected and signalled by a filter of the computer 18 which emits an alarm message, in the case of inconsistent measurements.

Reporting the calibration points on the curve (see FIG. 7) allows the polynomial equation of the calibration curve to be refined.

Figure 3:
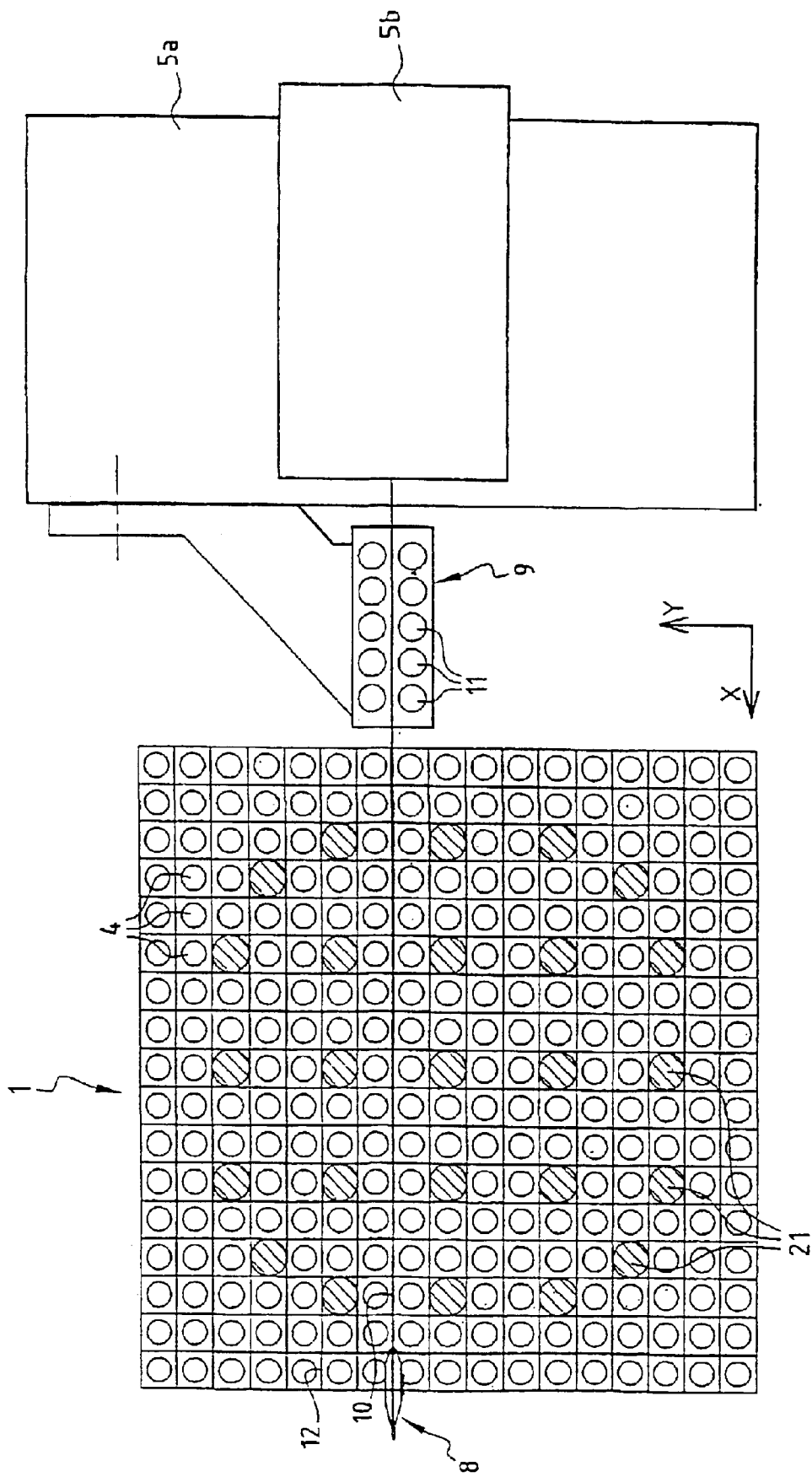
FIG. 3 is a plan view on a larger scale of a portion of the device illustrated in FIG. 2, during travel of the probe within a space between two rows of rods of a fuel assembly.

Next a scan is made of at least one row of fuel rods 4 delimiting the passing space 12 in which the probe 8 and the sabre 10 are moved (see FIG. 3) in the outward and return directions. In the outward direction, the probe 8 fixed to the end of the sabre 10 is moved in direction x, by moving away from the probe introduction face in the fuel assembly and, in the return direction, the probe 8 is brought back toward the introduction face of the fuel assembly opposite the cross-movement table probe movement device 5.

From the calibration curve, the values of the thicknesses corresponding to the signal troughs measured during the outward and return travel of the probe, are determined.

The consistency of the thickness measurements on the outward and return travel is checked and values obtained for the same rod that differ from each other by a value greater than a determined limit are signalled, for example using a filter.

Consistent measurement values are thus obtained on each rod; the positions, along the height of the fuel assembly, of the measurement zones are determined so as to be associated with the oxide thickness measurements.

The thickness values of the oxide layer of successive rods in a row of rods on which measurements have been taken are recorded and may be displayed.

After taking a measurement along the whole length of a row within a space between two rows of rods, the second element 5*b* of the cross-movement table 5 is moved in direction y, for example by one space, to place the sabre and the eddy current probe, together with the calibration support 9, in alignment with a new space between two new rows of rods of the fuel assembly.

As indicated above, movement of the carriage 5*a* of the cross-movement table can only occur when the sabre and the probe are fully extracted from the fuel assembly.

A new series of measurements is then taken on the tubes of a row of tubes lining the new passing space in which the sabre 10 and the eddy current probe 8 are being moved.

Measurements along the new row of tubes are taken after performing a new update of the calibration curve by passing the probe in contact with the standard tubes 11 of the calibration support 9 placed in alignment with the new probe passing space between the rows of fuel rods 4.

Measurements can thus be taken on each of the parallel rows of tubes of the fuel assembly that can be accessed from the face of the fuel assembly 1 turned toward the cross-movement table device allowing the probe 8 to be moved in direction X of the rows of tubes.

Measurements can be taken at different levels in the vertical axial direction of the fuel assembly between the spacer grids.

Measurements can be taken from each of the four faces of the fuel assembly 1, by turning the fuel assembly around its axis, between a series of measurements from a first face and a series of measurements from a second face of the fuel assembly.

The thickness of oxide on each rod of the fuel assembly, and along four rod generatrices disposed in the axial planes of the rod, perpendicular to each other and parallel to the faces of the fuel assembly, can thus be measured.

In all cases, the consistency of the measurements on the outward and return travel of the probe in the passing space between the rows of rods and between the adjacent rods along a row of rods can be checked. To do this, the difference in thickness of the oxide layer obtained on the outward and return travel of the probe for the same rod and on adjacent rods in the row of rods is calculated, and the differences obtained are compared to a limit value that is generally related to the precision of the measurements.

Measurements of abnormal signals also allow the position of the guide-tubes 21 of the fuel assembly (illustrated in FIG. 3) to be determined.

The quality of calibration is also checked by determining the deviation, in terms of the thickness of the oxide layer, between the calibration points measured on the standard tubes and the corresponding points of the calibration curve obtained by polynomial interpolation, for example of the order 2, in other words by using the curve equation in the form of a polynomial of the order 2.

As indicated above, the claddings of the rods of the fuel assemblies can be produced in different grades of zirconium alloy of which the electrical conductivity may be substantially different. Because calibration is carried out on oxidised tubes of the same grade of zirconium alloy, the measurements taken on the claddings of rods of different materials are not consistent.

Different measurements were taken, using an eddy current probe, on oxidised standard tubes of different grades of zirconium alloy.

For each grade of zirconium alloy, several standard tubes having several oxide thicknesses were used, the thickness of the oxide on the standard tubes in each grade being chosen from the same set of oxide thickness values.

Curves were plotted giving the amplitude of the eddy current probe signal in millivolts depending on the oxide thickness of the standard tubes. Parallel curves were obtained for the different alloys used for the standard tubes.

Therefore, passing from one grade to another produces only a linear shift that can be adjusted on the signals supplied with the eddy current probe in contact with the tubes of different zirconium alloys.

Figure 8:
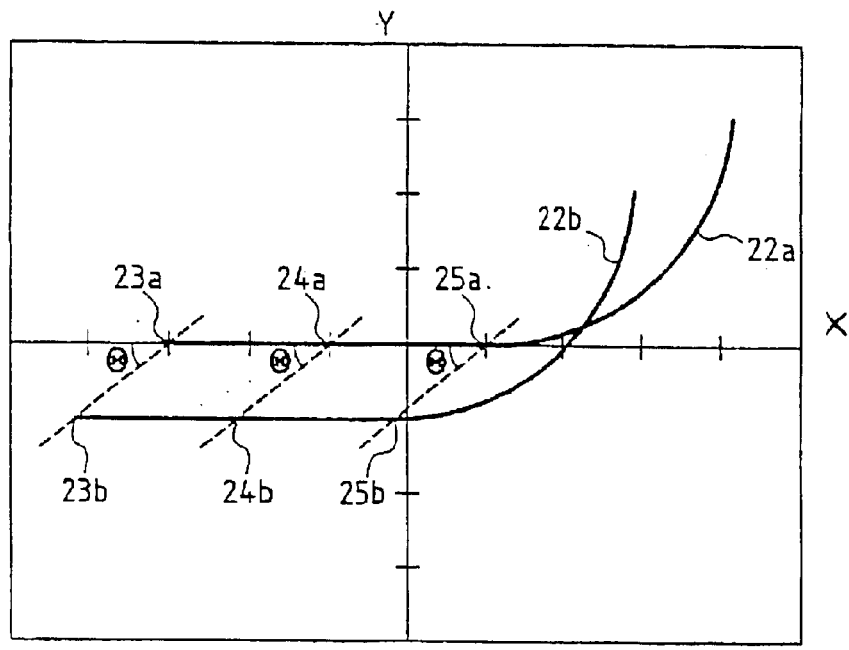
FIG. 8 and FIG. 9 show, on the screen of an eddy current instrument, the probe signal during two phases of a material difference compensation process between rods on which an oxide layer is being measured.

In FIG. 8, the eddy current probe signal is illustrated in the plane X, Y, appearing on the screen of the eddy current equipment when the signal from the eddy current probe in contact with three standard tubes in a first zirconium alloy and with three standard tubes in a second zirconium alloy is transmitted, the three standard tubes in the first grade of zirconium alloy and the three standard tubes in the second grade of zirconium alloy having different thicknesses of oxide, the three thicknesses of oxide of the standard tubes in the first grade being similar to the three thicknesses of oxide of the standard tubes in the second grade of zirconium alloy.

On the curve 22*a* are illustrated the points 23*a*, 24*a* and 25*a* relating to the measurements on the standard tubes in the first grade of zirconium alloy having three different thicknesses.

On the curve 22*b* are illustrated the points 23*b*, 24*b* and 25*b* corresponding to the measurement signals of the probe in contact with the three tubes in the second grade of zirconium alloy having three different thicknesses but similar to the thicknesses of the standard tubes that gave the respective measurement points 23*a*, 24*a* and 25*a* on the standard tubes in the first grade of zirconium alloy.

The signals of the measurement probe are illustrated in the impedance plane X-Y and the oxide thicknesses are obtained by projection on the X axis.

It will be seen that the projections on the X axis of points such as 23*a* and 23*b* or 24*a* and 24*b* or 25*a* and 25*b* obtained for different grades but identical thicknesses of oxide are different. Different representations of the oxide thickness are obtained for the two different grades of zirconium alloy. It is therefore necessary to conduct a calibration for each material, which has drawbacks.

Calibration tubes of different materials can also be used and, in this case, curves relating to the calibration points as illustrated in FIG. 8 are plotted.

The straight lines joining two points such as 23a and 23b, 24a and 24b, or 25a and 25b relating to identical oxide thicknesses and different materials of the standard tubes are all parallel to each other and form, with the X axis, an angle θ which is constant for each straight line.

Figure 9:
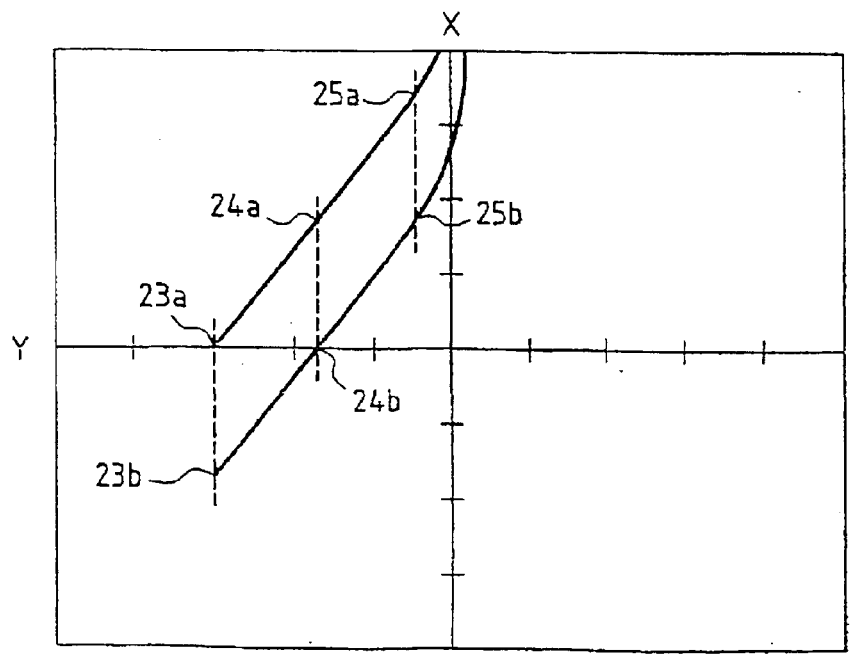

As illustrated in FIG. 9, the X-Y phase plane need only be turned on the eddy current equipment by an angle θ to place the segments of straight lines 23a, 23b, 24a, 24b, 25a, 25b in a position parallel to the Y axis and perpendicular to the X axis.

In this case, the projections of points relating to identical oxide thicknesses for the two grades of zirconium alloy have the same projection on the X axis, which makes it possible to avoid a re-calibration if there is a change in the material of the claddings of the fuel rods.

In practice, at least two standard tubes in different non-oxidised materials are used, placed on the calibration support, to obtain different measurement points in the impedance plane X-&, then the phase plane is turned by a sufficient angle to align the measurement points relating to the different grades of zirconium alloy with the perpendicular to the X axis of the phase plane.

The process and device according to the invention thus allow precise and reproducible measurements to be taken on the rods of a fuel assembly, whatever the material forming the rod cladding.

Of course, measurements can be taken at different heights along the fuel assembly, by moving the measuring device using an instrumentation carrier.

In particular, the invention process and device make it possible to dispense completely with the need for precise determination of the position of the probe in relation to the rod, at the moment of measuring the thickness of the oxide layer on the rod cladding. In fact, according to the invention, the successive troughs of the digitised probe signal are determined, as the probe travels in both directions, and the consistency of the measurements taken on each rod on the outward and return travel is checked completely automatically. In the case of consistent measurements for which the deviation on the outward and return movement is lower than the measurement precision, reliable and reproducible measurements of the thickness of the oxide layer on the rods are available.

The invention is not limited to the embodiment that has been described.

Thus, other means of processing the probe measurement signals than those described and other means of ensuring consistency of the measurements between one rod and the next in a row of rods, or between the measurements on the outward and return travel, than those described, can be envisaged.

The use of software of a different type to process the measurements can also be envisaged.

What is claimed is:

1. A process for measuring a thickness of a layer of oxide on a rod cladding in a fuel assembly having a bundle of rods distributed in an axial direction of the bundle, such that the rods are disposed in parallel rows with passing spaces provided between them and each disposed between two rows of rods comprising:

moving an eddy current probe under water and remotely in a bath in at least one space between two rows of rods, such that one of an active portion and a measuring head of the probe comes into contact with a generatrix of each rod in one of one and an other of the rows situated on either side of the passing space;

collecting and processing a signal of the probe corresponding to at least one of components of a voltage signal of the probe supplied with alternating current in an impedance plane to obtain values of the thickness of oxide on the rods with which the probe comes into contact, based on a calibration curve that is updated each time the probe passes in a space between two rows of rods further comprising:

moving the probe along a whole length of the space between two rows or rods and in an extension thereof such that the active portion of the probe comes into contact with either side of the passing space and standard tubes in an outward direction and in a return direction, opposite to the outward direction;

collecting and transmitting the probe signal in digital form to an arithmetic unit having software for processing the signal and determining the thickness of the oxide layer;

determining troughs of the probe signal as the signal travels in the passing space between the rows of rods;

adjusting the calibration curve based on values of the trough signal corresponding to a contact between the probe and the standard tubes of known oxide thickness, the trough values on contact with the standard tubes checked for consistency as the probe travels in an outward and in a return direction;

determining values of the thickness of the oxide layer corresponding to the signal troughs as the probe travels in the passing space between the rows of rods from the calibration curve;

checking a consistency of the thickness values obtained for each rod within a row of rods; and recording and displaying consistent values of the thickness of the oxide layer for each rod.

2. The process according to claim 1, wherein the consistency of the thickness values obtained for each rod in the row of rods is checked by comparing differences in thickness obtained during the outward and return travel of the probe and for the adjacent rods, with a limit value that is related to a measurement precision.

3. The process according to claim 1, wherein a quality of calibration is checked by calculating a deviation in terms of oxide layer thickness, between calibration points of the standard tubes and corresponding points of the calibration curve determined by polynomial interpolation.

4. The process according claim 1, wherein the probe is moved in contact with at least two standard tubes of materials having substantially different electrical resistivities, and further comprising:

collecting corresponding probe signals on eddy current measurement equipment comprising an arrangement for calculating and displaying the probe signal in an impedance plane and turning the impedance plane to place the points corresponding to the standard tubes of different materials on a same perpendicular to one of the axes of the impedance plane.

5. A device for measuring a thickness of a layer of oxide on a rod cladding in a fuel assembly having a bundle of rods parallel to each other, held in a frame work having spacer grids for transversely holding rods distributed in an axial direction of the bundle, such that the rods are disposed in parallel rows with passing spaces provided between them and each disposed between two rows of rods, the device comprising:

one of a metallic blade and sabre carrying, at a first longitudinal end, an eddy current probe and fixed, at a second opposite longitudinal end, to an element of an arrangement of moving the sabre and the probe in at least two directions of a horizontal plane, eddy current equipment connected to the probe to collect and process a probe signal, in a form of components in an impedance plane, during travel of the probe in contact with the cladding of the fuel rods of the fuel assembly; and a computer connected to eddy current equipment for receiving in digital form at least one of the components of the probe signal wherein the computer has software for processing at least one of the components of the signals in digital form to determine troughs of the component of the digital signal of the probe, during travel of the probe in a space between two rows of fuel rods to readjust a calibration curve giving a thickness of oxide on the rod claddings depending on a digitized component of the probe signal, in a form of a voltage, based on the signal of the probe in contact with standard tubes, in an outward and return direction, and comparison of one of the values of the component of the probe signal and the thickness value during the outward and return travel of the probe in contact with the rods within the passage between the rows of rods and in contact with the standard tubes.

6. The device according to claim 5, wherein the eddy current probe comprises a head having a measuring coil fixed by an elastic device to the first end portion of the metallic blade and a reference coil fixed to the first end portion of the metallic blade in a position adjacent to the measuring coil.

7. The device according to claim 5, wherein the standard tubes are fixed on a standard carrier integral with an element with the arrangement for moving the eddy current probe and the metallic blade such that the standard tubes can be placed in the alignment of the two rows of fuel rods of the fuel assembly between which is situated a passing space upon which the eddy current probe is moved, at least two standard tubes fixed on the standard carrier being produced in different material having substantially different electrical restrictions.

* * * * *